US007080595B2

(12) United States Patent
Babiel et al.

(10) Patent No.: US 7,080,595 B2
(45) Date of Patent: Jul. 25, 2006

(54) MANUALLY OPERATED PRESS

(75) Inventors: Hartmut Babiel, St. Georgen (DE); Werner Schubert, St. Georgen (DE)

(73) Assignee: Gebr. Schmidt Fabrik für Feinmechanik GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/985,676

(22) Filed: Nov. 11, 2004

(65) Prior Publication Data

US 2005/0115292 A1 Jun. 2, 2005

Related U.S. Application Data

(63) Continuation of application No. PCT/EP03/03238, filed on Mar. 28, 2003.

(30) Foreign Application Priority Data

May 16, 2002 (DE) ................................ 102 23 153

(51) Int. Cl.
*F16P 3/00* (2006.01)

(52) U.S. Cl. ......................... 100/341; 100/49; 100/292

(58) Field of Classification Search .................. 100/43, 100/48, 49, 50, 341, 353, 282, 292; 72/21.3, 72/441, 444; 192/12 C, 18 A, 12 D
See application file for complete search history.

(56) References Cited

U.S. PATENT DOCUMENTS 4,553,343 A * 11/1985 Primati et al. ................. 38/33
4,676,090 A * 6/1987 Nishimura et al. ........... 72/404
4,850,215 A * 7/1989 Landwehr et al. ............ 72/454
6,293,155 B1 9/2001 Babiel
6,755,124 B1 * 6/2004 Schubert ..................... 100/342
2001/0022142 A1 9/2001 Schubert

FOREIGN PATENT DOCUMENTS

| | | |
|---|---|---|
| DE | 35 33 003 A1 | 3/1987 |
| DE | 197 05 462 | 8/1998 |
| DE | 199 59 627 | 6/2001 |
| EP | 0 622 175 A1 | 11/1994 |
| FR | 2.041.420 | 1/1971 |
| FR | 2 286 339 | 4/1976 |
| JP | 11230191 | 8/1999 |

OTHER PUBLICATIONS

Translation copy of FR 2,041,420.*

* cited by examiner

*Primary Examiner*—Derris H. Banks
*Assistant Examiner*—Jimmy T. Nguyen
(74) *Attorney, Agent, or Firm*—Harness, Dickey & Pierce, P.L.C.

(57) ABSTRACT

A manually operated press has an actuating member, the movement of which being translated into a stroke movement of a press ram. A stroke stop is provided for inhibiting an undesired stroke movement of the press ram. The stroke stop comprises a first sensor for detecting the stroke movement of the press ram as well as a clutch. The clutch is actuated under the control of signals of the first sensor and is adapted to inhibit a transmission of force between the actuating member and the press ram.

12 Claims, 1 Drawing Sheet

MANUALLY OPERATED PRESS

CROSS-REFERENCES TO RELATED APPLICATIONS

This application is a continuation of copending international patent application PCT/EP03/03238 filed on Mar. 28, 2003 designating the U.S., which international patent application is published in German language and claims priority from German patent application DE 102 23 153.2, filed on May 16, 2002.

FIELD OF THE INVENTION

The present invention is related to the field of manually operated presses as are used for pressing workpieces together.

More specifically, the invention is related to a manually operated press having an actuating member, the movement of which being translated into a stroke movement of a press ram, a stroke stop being provided for inhibiting an undesired stroke movement of the press ram.

BACKGROUND OF THE INVENTION

A press of the afore-mentioned kind, in which the stroke stop is configured as a return stroke stop, is disclosed in DE 199 59 627 A1.

Manually operated presses of the type described above are conventionally used at piece-work workplaces. As the force to be exerted during a manual actuation of the press increases when the stroke end position is approached, some workers tend to effect the pressing operation only incompletely and to initiate the return stroke already ahead of the intended lower end position of the pressing stroke. However, the pressing operation is then not completed correctly so that workpieces of minor quality are generated or even scrap.

In order to counteract these problems, on has equipped manually operated presses with a so-called return stroke stop. In conventional manually operated presses the return stroke stop is configured mechanically. In the above-mentioned prior art press the mechanical return stroke stop is configured by means of a grooved disk together with a latching pin. When a manual lever is actuated, the grooved disk is rotated and the latching pin runs along a predetermined groove track of the grooved disk. At two positions corresponding to the end of the coarse stroke and the beginning of the fine stroke, resp., the groove track is provided with steps. As soon as the latching pin has jumped over a step, the grooved disk may no more be rotated rearwardly over such step, i.e. the press ram may no more be displaced back upwardly. Only when the press ram has run through the entire press stroke, the latching pin assumes a position in which it may automatically return to the beginning of the groove track. Accordingly, the press ram may only be displaced again upwardly into its initial position, when the press ram has entirely run through its stroke.

Although the concept described before has been well approved in practice, further improvements are desired under various aspects.

To begin with, a first problem exists in that conventional pressing operations are not adapted to be documented, in contrast to automatically effected pressing operations in which numerically controlled pneumatic presses are conventionally used. In many fields of application this is no more acceptable, in particular when production processes shall be certified according to the ISO 9000 standard.

A second problem with manually operated presses of the type specified at the outset consists in that an individual grooved disk has to be manufactured for each pressing operation. This is because the length of the coarse stroke and the length of the fine stroke individually depend on the particular workpiece to be joined. All that has a negative impact on so-called sequential multiple pressings. In such working operations a plurality of items are joined together one after the other in a sequence of pressing sub-operations, for example a Seeger circlip ring, a bearing, a pinion, a gasket etc. are joined onto a shaft one after the other.

Conventionally, one has effected such multiple pressings by effecting the individual sub-operations one after the other at different workplaces. As a consequence, as many workers were required as individual pressing sub-operations had to be effected.

Finally, a third problem exists with conventional manually operated presses of the type specified at the outset, to ensure that so-called good workpieces are distinguished from so-called bad workpieces. In this context, it has been known, for example from DE 197 05 462 A1, to equip a press with a first sensor for detecting the press stroke travel and with a second sensor for detecting the pressing force, and to generate a travel vs. force diagram for each pressing operation being indicative for a good or a bad pressing operation, resp. Namely, if the measured travel vs. force curve is within a predetermined tolerance band, the particular workpiece is determined to be well pressed, i.e. to be a good workpiece. In the alternative, the workpiece is determined to be a bad workpiece, i.e. to be scrap which has to be disposed of.

With automatic presses having a pneumatic drive, it is known in this context to switch the press off when a bad workpiece is detected, the switching off being effected when the bad workpiece is still within the press. The reason for this measure is to prevent the worker from simply continuing his work after a bad workpiece was detected. Instead, the worker has to call for his foreman or master who puts the press back into operation, for example by actuating a key operated switch with a special key. For putting the press back into operation it is, however, mandatory to remove the bad workpiece beforehand. Considering that this procedure generates a lot of attention, it may be assumed that the bad workpiece, after having been removed from the press, is transferred into a special bad workpiece container and is eliminated from the further process.

Finally, there are situations in which one wants to prevent that the press ram may be displaced beyond a predetermined stroke position during the working stroke, wherein it should be possible to determine this position depending on the particular process.

It is an object underlying the invention to further improve a manually operated press such that the above-mentioned problems are avoided. In particular, a manually operated press shall be provided, in which the pressing operations may be documented, in which multiple pressings may be effected in a simple manner and without the need of making mechanical modifications, and, finally having the option to provide for means guaranteeing the elimination of bad workpieces with a high probability.

SUMMARY OF THE INVENTION

In a press of the afore-mentioned kind, this object is achieved in that the stroke stop comprises a first sensor for detecting the stroke movement of the press ram as well as a clutch, the clutch being actuated under the control of signals of the first sensor and being adapted to inhibit a transmission of force between the actuating member and the press ram.

The object underlying the invention is thus entirely solved.

As the stroke stop is configured electronically, in contrast to the prior art, one has, unlike hitherto, the possibility to document pressing operations, so that production processes utilizing manually operated presses may be certified according to ISO 9000 standard.

The control used in conjunction with the press according to the invention, further, has the advantage that the latching points of the stroke stop may be programmed externally so that the press may be operated parametrically and remotely controlled. By respective programming the already mentioned sequential multiple pressings may be executed because the latching points that must be set therefore, for example for three or four subsequent pressing sub-operations each, may be reset individually for being repeated cyclically.

According to the invention, the press may be configured as a return stroke stop means inhibiting a return stroke movement of the press ram before it has reached a predetermined end position. As an alternative, the press may also be configured as a working stroke stop means inhibiting a further working stroke movement of the press ram beyond a predetermined stroke position.

In a first embodiment of the press according to the invention, the press ram is adapted to be secured in a stationary manner by means of the clutch.

This measure has the advantage that the entire press is immobilized, so that a worker cannot make any manipulations to the press when, contrary to the applicable rule, a return stroke operation is initiated prior to reaching the end position of the pressing stroke.

In a preferred design variation of this embodiment, the actuating member, as known per se, is configured as an actuating lever connected to a shaft, the shaft being rotated when the actuating lever is pivoted. Insofar it is preferred when a first disk is rigidly arranged on the shaft to rotate therewith, a stationary second disk being arranged adjacent the first disk, the disks being configured as coupling disks of the clutch.

This measure has the advantage that a very compact arrangement is achieved that is easy to control.

This holds particularly true when the first sensor cooperates with markers arranged on the first disk.

This measure has the advantage that for detecting the stroke movement of the press ram an angle sensor may be used, for example a commercially available angle sensor detecting incremental markers arranged on the periphery of the rotatable disk. Such a sensor may, for example, be configured in a fork-like manner or the like.

In an alternate embodiment of the press according to the invention, the clutch is inserted into a flow of force between the actuating member and the press ram. In that case it is likewise prevented that a return stroke movement of the press ram is initiated through a movement of the actuating member in a wrong direction, because the actuating member runs free when the clutch is actuated since a transmission of force to the press ram is interrupted.

In any event, it is preferred according to the invention when the clutch is a magnetic clutch. It may, however, also be operable in a pneumatic or hydraulic manner.

This measure, too, has the advantage that commercially available components may be used which may easily be mounted and controlled.

In another group of preferred embodiments it is preferred when in a manner, also known per se, a second sensor is provided for detecting during a pressing operation a pressing force exerted by the press ram, and means for deriving from a pressing force vs. stroke movement function a signal indicative for a quality of the pressing operation.

This measure has the advantage that now also for manually operated presses an immediate quality control becomes possible through a force vs. travel diagram, which is particularly welcome for the intended certificability. The invention, insofar, takes advantage of the fact that for making the already described electronic return stroke stop a first sensor for detecting the pressing stroke must be provided anyway, which, for a second purpose, may also be used for establishing force vs. travel diagrams.

A particularly preferred embodiment of the last mentioned embodiment consists in that an end of the pressing operation the transmission of force between the actuating member and the press ram is interrupted in the first place and is reestablished only when the signal indicates that the pressing operation is within standard.

This measure has the advantage that an immediate taking out of the pressed workpiece is only possible in those instances in which the afore-mentioned quality control has determined a good workpiece. Only then the subsequent pressing operation is released. In all other instances the badly pressed workpiece remains within the press and particular measures have to be taken to remove that bad workpiece from the press, thus creating sufficient attention for professionally disposing of the bad workpiece.

Further advantages will become apparent from the description and the enclosed drawing.

It goes without saying that the afore-mentioned features as well as the features that will be explained hereinafter may not only be used in the particularly given combination but also in other combinations without leaving the scope of the present invention.

An embodiment of the invention is depicted in the drawing and will be further explained in the subsequent description.

DETAILED DESCRIPTION OF THE PREFERRED EMBODIMENTS

Figure 1:
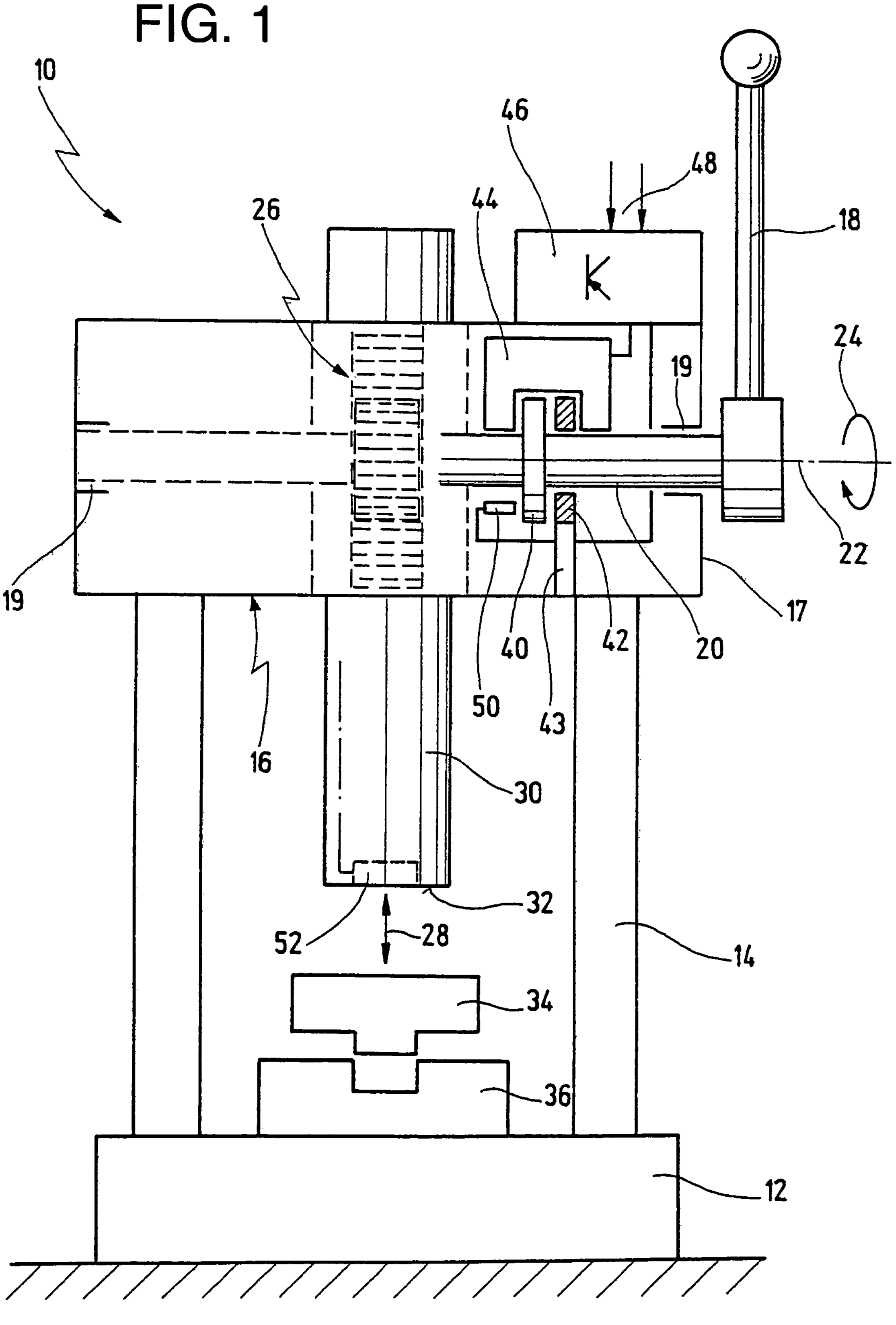
FIG. 1 shows a schematic side elevational view of an embodiment of a press according to the invention.

In FIG. 1, reference numeral 10 as a whole indicates a manually operated press as principally known per se.

Press 10 has a base member 12 resting on an appropriate base, for example a working bench. Posts 14 extend upwardly from base member 12 towards a top member 16, the housing of which being indicated at 17. An actuating lever 18 may be seen laterally at top member 16. Actuating lever 18 is connected to a shaft 20 journalled within housing 17 by means of bearings 19. Accordingly, shaft 20 may be rotated about its axis 22 by pivoting actuating lever 18 as indicated by an arrow 24.

Top member 16 houses a gearing 26 as indicated extremely schematically. In the simplest case, gearing 26 is configured as a pinion-rack arrangement. The purpose of this arrangement is to convert a rotary movement of shaft 20 into a vertical movement of a press ram 30 as indicated by an arrow 28.

A lower front surface 32 of press ram 30 comes to rest on an upper workpiece 34 of a pair of workpieces 34, 36 that shall be pressed together.

Insofar, press 10 is of conventional design.

In contrast to conventional presses, however, press 10 is provided with a first disk 40 rigidly arranged on shaft 20 to rotate therewith. A second disk 42 is arranged adjacent first disk 40. Second disk 42, as indicated by a sectional depiction in the figure, is configured as a ring such that shaft 20 may extend through second disk 42. Second disk 42 is connected to housing 17 by means of a support 43, and is, hence, stationary.

Reference numeral 44 indicates a clutch comprising both disks 40 and 42 serving as clutch disks. Clutch 44, preferably, is a magnetic clutch, however, may also be configured to be operated pneumatically or hydraulically.

Clutch 44 is preferably a magnetic clutch. It is electrically connected to an electronic control unit 46. Control signals may be fed to electronic control unit 44 via inputs 48, for example from a numerical control unit.

A first sensor 50 is arranged next to first disk 40. First sensor 50 cooperates with markers on first disk 40, in particular with incremental markers arranged on the periphery of first disk 40. First sensor 50 may be designed in a rod-like or in a fork-like manner or the like. It continuously detects the rotation of first disk 40 and, via the transmission factor of gearing 26, the stroke movement and, hence, the travel of press ram 30. First sensor 50 is likewise connected to electronic control unit 46.

In embodiments of the invention press ram 30 may be provided with a second sensor 52 with which the prevailing pressing force may be detected. Second sensor 52 is likewise connected to electronic control unit 46.

Press 10 according to the figure operates as follows:

Within electronic control unit 46 certain parameters are stored for a particular pressing operation, for example for workpieces 34 and 36 shown in the figure. The parameters may, for example, correspond to travel markers for the end of the coarse stroke and for the end of the fine stroke. By doing so a return stroke stop may be configured.

If the worker in such a situation pivotes actuating lever 18, shaft 20 rotates and press ram 30 advances downwardly. The rotation of shaft 20 and, hence the stroke movement of press ram 30 is continuously detected by first sensor 50. If now, for example, the first marker is detected which corresponds to the end of the coarse stroke, clutch 44 would be closed if the worker should attempt to again move actuating lever 18 in a reverse direction after the first marker is passed. By closing clutch 44 first disk 40 would be connected to second disk 42 by friction and, hence secured in a stationary manner. The worker could, hence, move actuating lever 18 no more.

In an alternate embodiment one could interrupt the flow of force within shaft 20 by means of an appropriate clutch. For that purpose, shaft 20 would have to be subdivided in two axial sections with first disk 40 arranged on the left hand section and second disk 42 arranged on the right hand section of shaft 20, such that the sections of the shaft could connected for joint rotation with each other by means of clutch 44 or, alternately, could be separated from each other.

It goes without saying that by correspondingly inputting parameters via inputs 48 arbitrary markers for the pressing operations may be set without the necessity of making any mechanical modifications to press 10. For example, also the end position of the stroke may be set electronically. Manually operated press 10 may, thereby, become part of a computer controlled manufacturing.

In an analogous manner a working stroke stop may be implemented, inhibiting press ram 30 to travel beyond a predetermined stroke position.

Considering that, according to the preceding description, for the electronic return stroke stop a first sensor 50 is provided anyway for detecting the travel of press ram 30, advantage may be taken therefrom according to the invention by providing a second sensor for the detection of force, as known per se.

Electronic control unit may namely then generate a force vs. travel diagram, and thereby a criterion for wether workpieces have been pressed together in a "good" or in a "bad" manner.

The force vs. travel diagrams may, of course, be read from electronic control unit 46 and be fed to a central data processing unit for the documentation of the entire manufacturing process.

If press 10 is provided with that optional quality detection, the control of press 10 by electronic control unit 46 my preferably set such that clutch 44 is closed at the end of the pressing operation and the entire unit is immobilised for the time being. The immobilisation of press 10 has the effect that press 10 may not be operated any more for the time being. Of course, this condition is only maintained as long as it takes to verify the quality of the pressing operation just completed.

If this verification shows that a good workpiece was generated, clutch 44 is opened immediately so that the worker may take out the pressed workpiece and start the next pressing operation.

If, however, the verification shows that a bad workpiece was generated, clutch 44 remains closed so that the worker may execute no further pressing operations on press 10. Only when the interlock is removed by overriding electronic control unit 46 accordingly, thereby re-opening clutch 44, the pressing operations may be continued. As all this requires the intervention of a superior person and generates a certain attention, it may be guaranteed in this manner that the generated bad workpiece is in fact disposed of according to a predetermined procedure and does not erroneously find its way to the good workpieces.

The invention claimed is:

1. A manually operated press comprising:
- a press ram;
- an actuating member,
- means for translating a movement of said actuating member into a stroke movement of said press ram;
- stroke stop means for inhibiting an undesired stroke movement of said press ram, said stroke stop means comprising a first sensor for detecting said stroke movement of said press ram; and
- a clutch, said clutch being actuated under control of signals of said first sensor, and being adapted to inhibit a transmission of force between said actuating member and said press ram, wherein said clutch is inserted into a flow of force between said actuating member and said press ram.

2. The press of claim 1, wherein said stroke stop means is configured as a return stroke stop means inhibiting a return stroke movement of said press ram before it has reached a predetermined end position.

3. The press of claim 1, wherein said stroke stop means is configured as a working stroke stop means inhibiting a further working stroke movement of said press ram beyond a predetermined stroke position.

4. The press of claim 1, wherein said press ram is adapted to be secured in a stationary manner by means of said clutch.

5. The press of claim 4, wherein said actuating member is configured as an actuating lever connected to a shaft, said shaft being rotated when said actuating lever is pivoted.

6. The press of claim 5, wherein a first disk is rigidly arranged on said shaft to rotate therewith, a stationary second disk being arranged adjacent said first disk, said disks being configured as coupling disks of said clutch.

7. The press of claim 6, wherein said first sensor cooperates with markers arranged on said first disk.

8. The press of claim 1, wherein said clutch is a magnetic clutch.

9. The press of claim 1, wherein said clutch is a pneumatic clutch.

10. The press of claim 1, wherein said clutch is a hydraulic clutch.

11. A manually operated press comprising:

a press ram;

an actuating member, means for translating a movement of said actuating member into a stroke movement of said press ram;

stroke stop means for inhibiting an undesired stroke movement of said press ram, said stroke stop means comprising a first sensor for detecting said stroke movement of said press ram;

a clutch, said clutch being actuated under control of signals of said first sensor, and being adapted to inhibit a transmission of force between said actuating member and said press ram; and a second sensor for detecting during a pressing operation a pressing force exerted by said press ram, and means for deriving from a pressing force and stroke movement function a signal indicative of the quality of said pressing operation.

12. The press of claim 11, wherein at an end of said pressing operation said transmission of force between said actuating member and said press ram is interrupted in the first place and is re-established only when said signal indicates that said pressing operation is within standard.

* * * * *